Patented Aug. 7, 1945

2,381,145

UNITED STATES PATENT OFFICE

2,381,145
STABLE DIAZO SALT PREPARATION

William Henry von Glahn, Loudonville, William Leo Walsh, East Greenbush, and Clemens Streck, Albany, N. Y., assignors to General Aniline & Film Corporation, New York, N. Y., a corporation of Delaware No Drawing. Application September 20, 1940, Serial No. 357,614

3 Claims. (Cl. 8—44)

Additions of aryl sulfonic acids to stable diazo salt preparations for the purpose of improving the solubility and stability of the latter are known. It has now been found that addition of aliphatic sulfonic acids or soluble salts thereof to diazo salt compounds is of especial value in increasing the stability of the dyeing solution or printing paste obtained from such salts. When a printing paste is made up from the usual diazo salt compounds, decomposition soon sets in, resulting in a rapid decrease in strength and ultimate deterioration of the diazo compound. The disadvantage to the printer is obvious. Unless the paste is used within a few hours of its preparation, it must be discarded and a new batch prepared.

According to the present invention, this disadvantage is obviated by the addition to the diazo salt compound of a readily soluble aliphatic sulfonic acid or a soluble salt thereof. The latter may optionally be incorporated in the dry diazo salts or in the wet presscake of the diazo salts or they may be added during the dyeing or printing operations. It is immaterial for the purpose of the present invention whether chemical reactions take place, i. e. whether the diazo salt of the aliphatic sulfonic acids is formed or whether the aliphatic sulfonic acids act only as stabilizers in some other way.

In general, any aliphatic sulfonic acid or soluble salt thereof which cannot couple or form a diazo amino compound with a diazo salt under dyeing or printing conditions is suitable for the purpose of the present invention. Soluble salts of mono and poly-aliphatic sulfonic acids, which may be variously substituted by the known substituents, are to be preferred for obtaining the object of this invention. In general, the aliphatic sulfonic acids which may be used in accordance with our invention correspond to the formula $R(CH_2)_nSO_3H$ in which $n$ is a whole number, R is H, halogen, $SO_3H$, COOH, OH or an alkyl group which may be substituted with halogen, hydroxy, sulfo or the like. Sulfonic acids which contain aryl nuclei such as benzene and naphthalene nuclei, whether hydrogenated or not hydrogenated, are expressly excluded from the scope of the present invention. We furthermore exclude from this invention the use of alkyl sulfuric acid esters which are the object of a copending application.

The invention is illustrated, but by no means limited thereto, by the following examples in which the parts are given by weight.

Example 1

100 parts of the diazo salt compound made by drying with $Al_2(SO_4)_3 6H_2O$ the moist press cake of diazo-2.5-dichloraniline zinc chloride double salt are intimately mixed with 10 parts of ethane disulfonic acid disodium salt. A diazo salt preparation with greatly improved stability in dyeing and printing operations is thereby obtained.

Example 2

100 parts of a dry mixture containing sodium sulfate and the zinc chloride double salt of diazo-4-chlor-2-nitraniline are mixed with 10 parts of the sodium salt of beta-chlor-ethane sulfonic acid. A diazo salt giving a printing paste of excellent stability is produced by such admixture.

Example 3

The moist presscake of the zinc chloride double salt of tetrazo dianisidine is mixed with about 5% of diethyl ether disulfonic acid mono sodium salt. Hydrated magnesium sulfate is added and the mixture dried at 40° C. to a powder containing 20% base. The printing paste of this product has an excellent stability, far superior to a similar printing paste made up without the above disulfonic acid sodium salt.

Example 4

100 parts of a dry powder containing the mixed zinc chloride and tin chloride double salts of diazo-4-nitro-2-anisidine are mixed with 20 parts of methane sulfonic acid. The resulting diazo salt is much more stable in the printing paste than a salt containing no such addition.

Example 5

15 parts of the sodium salt of propane disulfonic acid were intimately mixed with 100 parts of the dry mixture of aluminum sulfate and the zinc chloride double salt of diazo-3-nitro-4-anisidine. A salt more stable in printing and dyeing operations is thus formed.

Example 6

4.5 parts of the dry standardized mixture of the zinc chloride double salt of diazo-2.5-dichloraniline, containing 20% of the base, are dissolved in 25 cc. of water which contains 0.5 part of ethylene diamine-N.N'-tetrasulfonic acid disodium salt. This solution is converted into a printing paste with a thickener. It is far more stable than the same printing paste which does not contain the above aliphatic sulfonate.

*Example 7*

A mixture of 10 parts of the naphthalene disulfonate of diazotized ortho-nitraniline is intimately mixed with 4 parts of ethane disulfonic acid disodium salt. This mixture is easily soluble in water yielding a clear solution which is of excellent stability.

The term diazo salt compound employed herein is intended to include stable diazonium chlorides, carbonates and sulfates, diazo sulfonates, salts of diazos with fluoroboric acid, fluorosulfonic acid, heavy metal chlorides and the like.

We claim:

1. Diazo salt preparations containing a diazo salt and an aliphatic sulfonic acid compound selected from the group consisting of aliphatic mono- and poly-sulfonic acids containing not more than four carbon atoms and water-soluble salts thereof.

2. Diazo salt preparations containing a diazo salt and an aliphatic sulfonic acid compound having the formula $$R(CH_2)_nSO_3H$$

wherein $n$ is a whole number not larger than three and R is a member selected from the group consisting of H, halogen and $SO_3H$.

3. Diazo salt preparations containing diazo-2.5-dichlor aniline zinc chloride double salt and ethane disulfonic acid disodium salt.

WILLIAM HENRY von GLAHN.
WILLIAM LEO WALSH.
CLEMENS STRECK.